ERROR DETECTING AND CORRECTING CIRCUIT

Filed Feb. 23, 1960 7 Sheets-Sheet 1

INVENTOR.
WILLIAM E. BRANDT
BY John F. Hanifin
ATTORNEY

ERROR DETECTING AND CORRECTING CIRCUIT

Sept. 28, 1965 W. E. BRANDT 3,209,327

ERROR DETECTING AND CORRECTING CIRCUIT

Filed Feb. 23, 1960 7 Sheets-Sheet 5

United States Patent Office 3,209,327
Patented Sept. 28, 1965

3,209,327
ERROR DETECTING AND CORRECTING CIRCUIT
William E. Brandt, Wappingers Falls, N.Y., assignor to International Business Machines Corporation, New York, N.Y., a corporation of New York
Filed Feb. 23, 1960, Ser. No. 10,282
11 Claims. (Cl. 340—146.1)

This invention relates to permutation code systems and in particular to apparatus for detecting and correcting errors which impair the accuracy of the information of such systems.

Present day digital computers employ a binary permutation code system. In these systems, computer words are represented by a series of 0's or 1's in any permutation arrangement. Any individual bit position in the computer word consists of a 0 or a 1. The 0 or 1 which represents information in any bit position is represented by one of two conditions. These conditions might be the presence or absence of a pulse, a positive or a negative voltage, or the ON and OFF condition of a transistor or vacuum tube.

The prior art offers systems and methods of checking the accuracy of the binary coded word. Some of these systems consist of providing extra or redundant bit positions in addition to the bits which represent data in the code group. These extra bit positions serve the function of providing a code system wherein the computer word must be coded with a definite number of 1's. Equipment is provided for insuring that the proper number of 1 bits have been transmitted or received. The systems just described are limited in that only the detection of some kind of error is possible. This will cause an alarm to note the existence of the error and will require operations to cease for correction by the operator.

Single error correction and double error detection has been devised in at least one system wherein a computer word consists of a plurality of information or data bits and a plurality of redundant bits for error detection and correction. Each redundant bit position represents the "parity" of a unique combination of the information bit positions. The redundant bit which acts as a parity for a unique combination of data bits will be either a 0 or a 1 in order to make the entire combination of data bits plus the redundant bit represent an even number of 1's. The computer word which contains data and error detection information is then transmitted to a receiving station. The receiving station then tests the accuracy of the data transfer by decoding the received computer word. In at least one prior art device the received word is decoded and if an error exists in the received data portion of the computer word, the redundant bits and data bits will combine in such a way to detect the presence of the error and also locate the particular data bit in error causing a correction to be made. If the data bit was received erroneously as a 0, the unique combination of data bits plus the redundant bits will locate the data bit in error and cause a reversal of the signal condition, to correct the data bit in error to a 1. Similarly, if a data bit was received erroneously as a 1, it will be corrected to a 0.

The last mentioned prior art system, although advancing the state of the art to provide not only error detection but also error correction, provided no means for insuring the correct encoding of the error detecting bits. The device only assumed that encoding was proper before transmission of the word. If an error occurred in one of the redundant bits during the transmission, an erroneous change would be made in a data bit which was correct. No provision was made for correcting the entire encoded word in a storage device before transmission. This would require a correction to be made after each transmission if the computer word were used several times.

The device was also limited in that a plurality of relays, with a plurality of contacts on each relay, were used. Such a device would not be suitable for very high speed, reliable computing devices now used.

Prior art devices have also been limited in their operation by only providing for a single correction to be made. These systems do not provide means whereby an encoded word may be corrected and thereafter rechecked for correct information. These devices assume the correction has been made properly. Even with the double error detection and single error correction system noted above, double error detection only provided for halting of machine operation which might have been unnecessary if a recheck had been made.

It is accordingly an object of this invention to provide an error detecting and correcting system for use in very high speed electronic digital computers.

It is a further object of this invention to provide means for indicating the presence of no errors, a single error, or a double error in a computer word.

It is also an object of this invention to provide an error detecting and correcting system which will correct a single error in all bit positions of a computer word.

It is a further object of this invention to provide an error detecting and correcting system which requires no moving mechanical parts.

It is a further object of this invention to provide an error detecting and correcting system wherein individual components of the system are able to perform more than a single function in the system.

It is also another object of this invention to provide for single error correction with ability to recheck the same computer word after the correction to insure the correction has been made properly.

It is also another object of this invention to provide means for counting the number of cycles there has been a single error detected in one computer word for producing a control signal in response thereto, capable of initiating rechecking of the computer word without attempting a correction.

It is also an object of this invention to provide a signal for stopping machine operations after a predetermined number of check cycles have detected a single error in one computer word.

It is a further object of this invention to provide for counting the number of check cycles in which a double error has occurred in one computer word for producing a plurality of control signals in response thereto capable of causing rechecking or reloading of the computer word.

It is an additional object of this invention to provide a control signal to cause a halt in machine operations after a predetermined number of check cycles have detected double errors in one computer word.

To these and other objects of this invention are obtained in a specific embodiment wherein a computer word consisting of a plurality of bits is loaded into a data storage device. The computer word is caused to be read out to an error detector, by a decoding matrix. The error detector produces a plurality of signals indicating the presence of no error, a single error, or a double error. If a single error has been detected, the error detector will provide a signal to the aforementioned decoding matrix identifying the particular bit in the word which is in error.

The signals from the detector indicating the type of error are applied to an error analyzer. The error analyzer produces control signals in response to the number of check cycles a particular type of error has been detected.

The signals produced by the error analyzer provide the necessary control signals for initiating correcting procedures, and/or rechecking, and/or re-loading of the computer word into the storage device.

The foregoing and other objects, features, and advantages of the invention will be apparent from the following more particular description of a preferred embodiment of the invention, as illustrated in the accompanying drawings.

Figure 1:
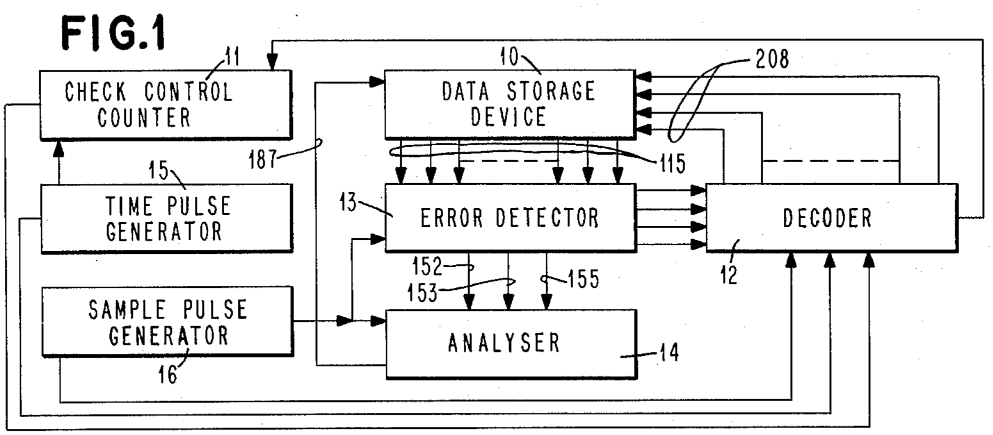
FIG. 1 is a simplified block diagram of an error detecting and correcting system in accordance with the principles of this invention.
Figures 2, 3:
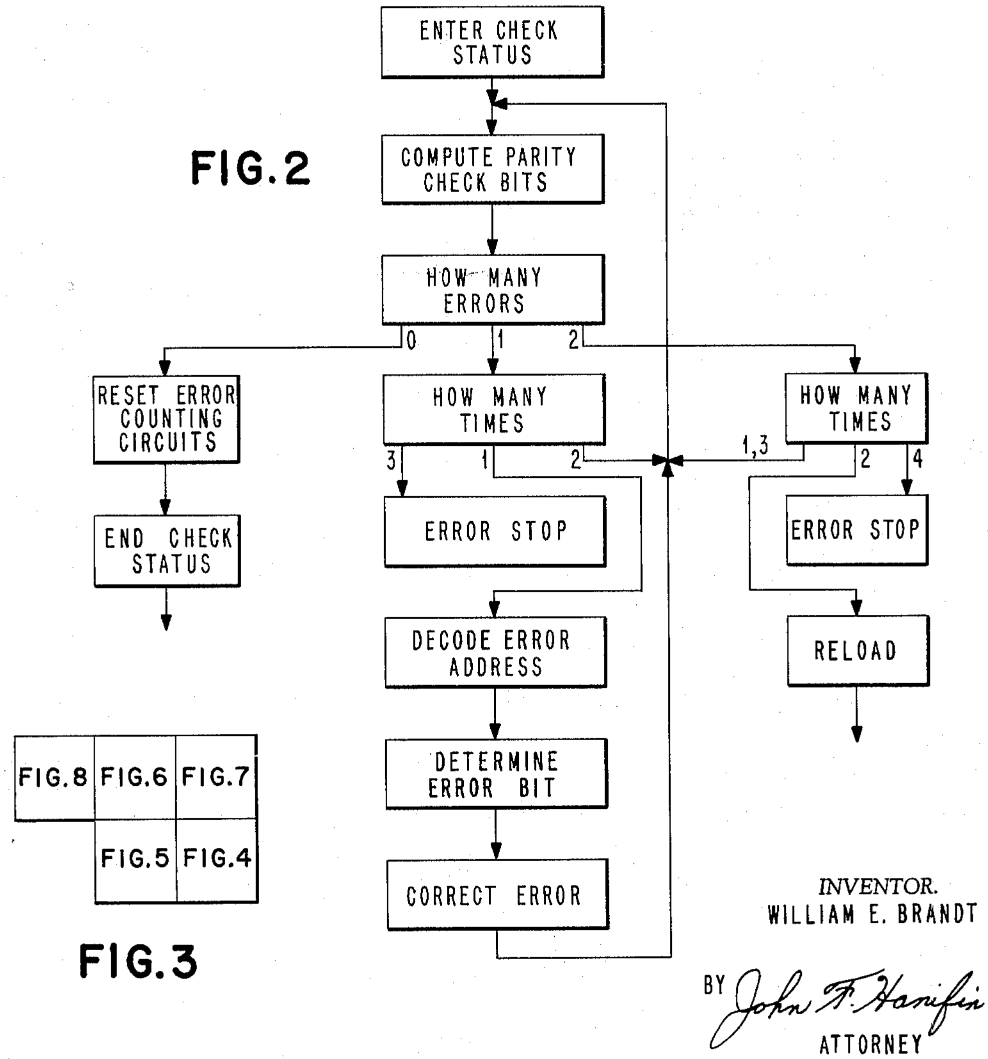
FIG. 2 is a flow chart of the operations performed by the system constructed in accordance with the principles of this invention.
FIG. 3 is a diagram which illustrates the manner in which FIGS. 4–8 should be arranged to effect interconnection of the circuits in those figures.
Figure 4:
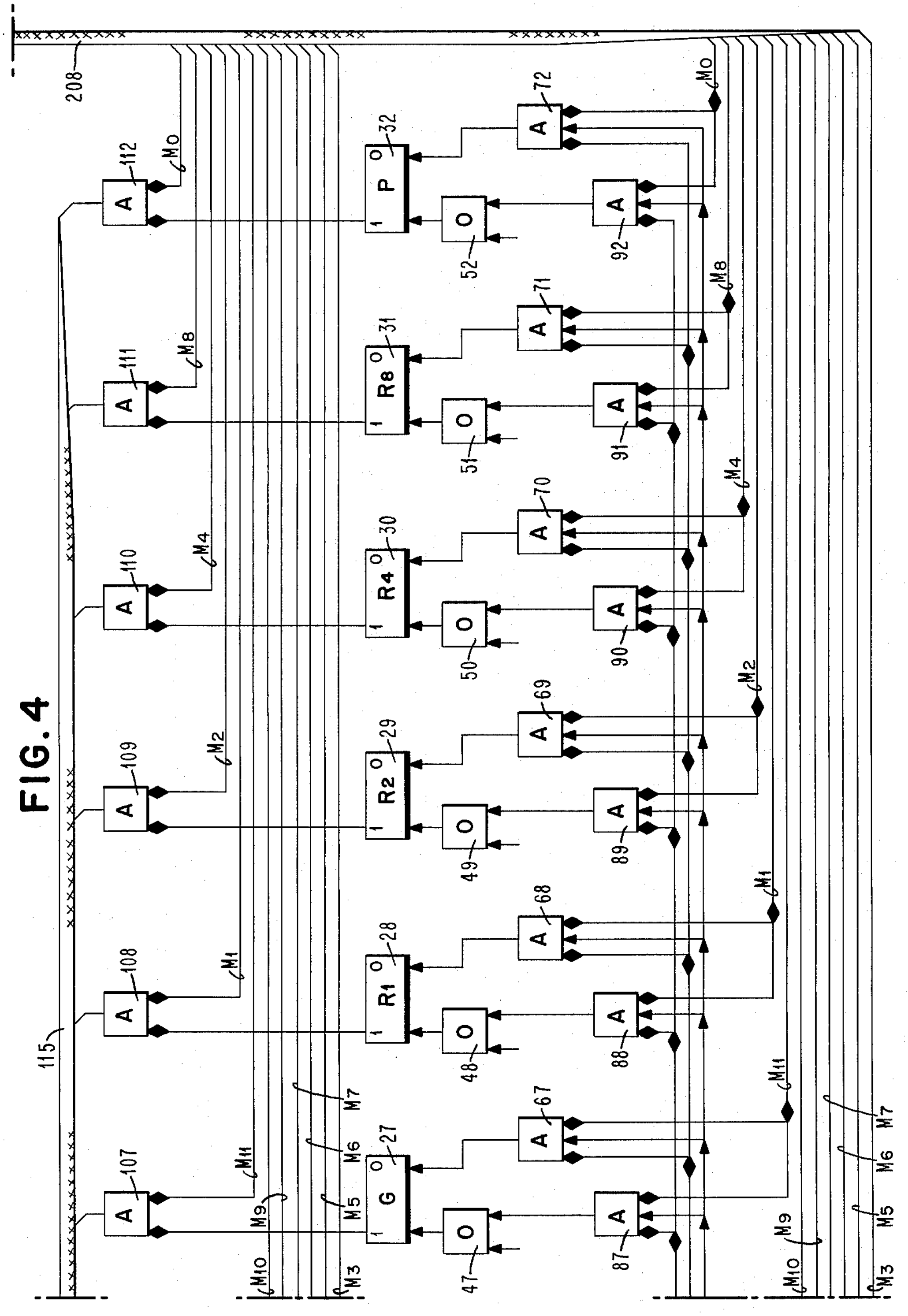
Figure 5:
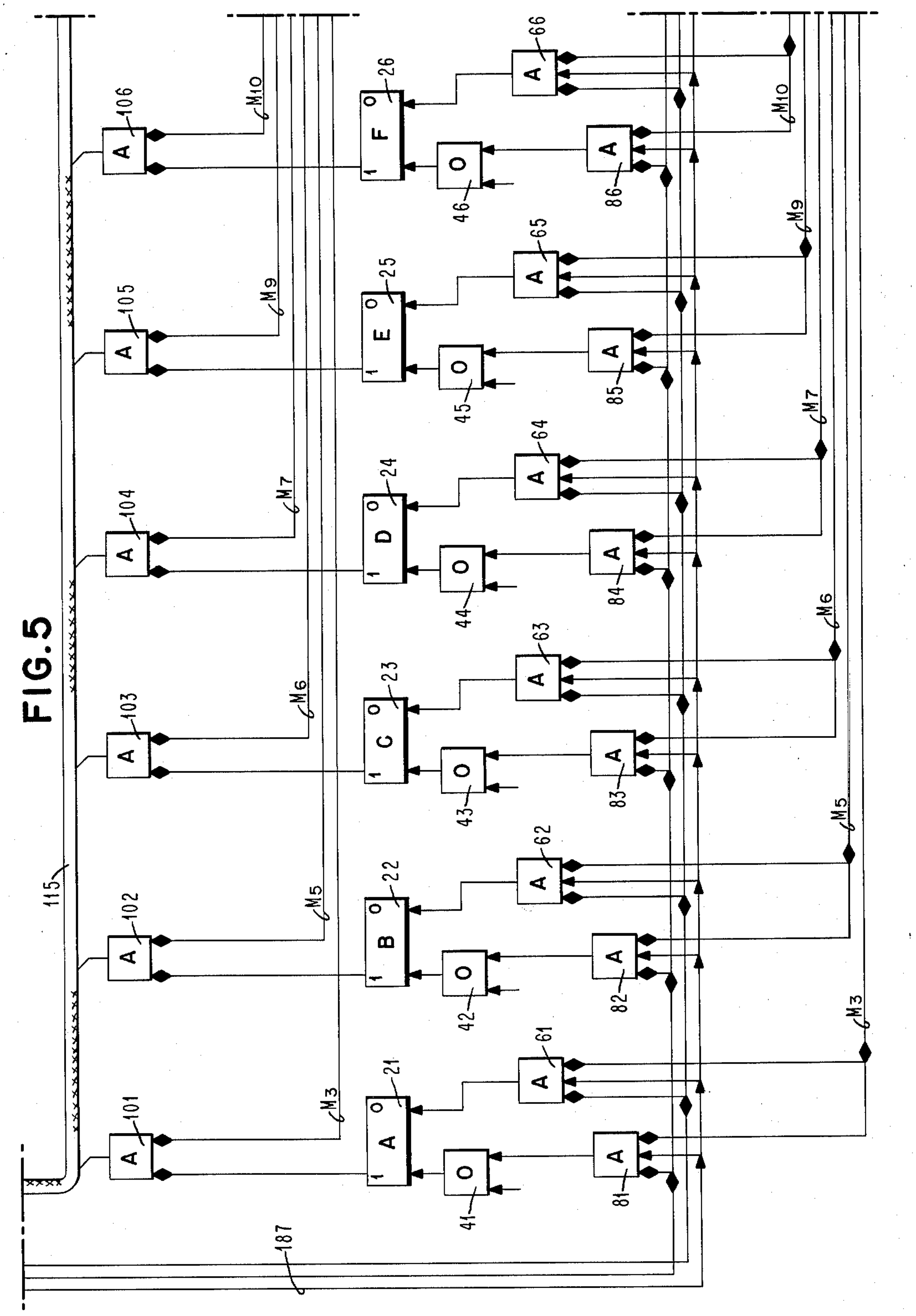

FIGS. 4 and 5 when arranged as shown in FIG. 3 form a logical block diagram of a data storage device shown as block 10 in FIG. 1.

Figure 6:
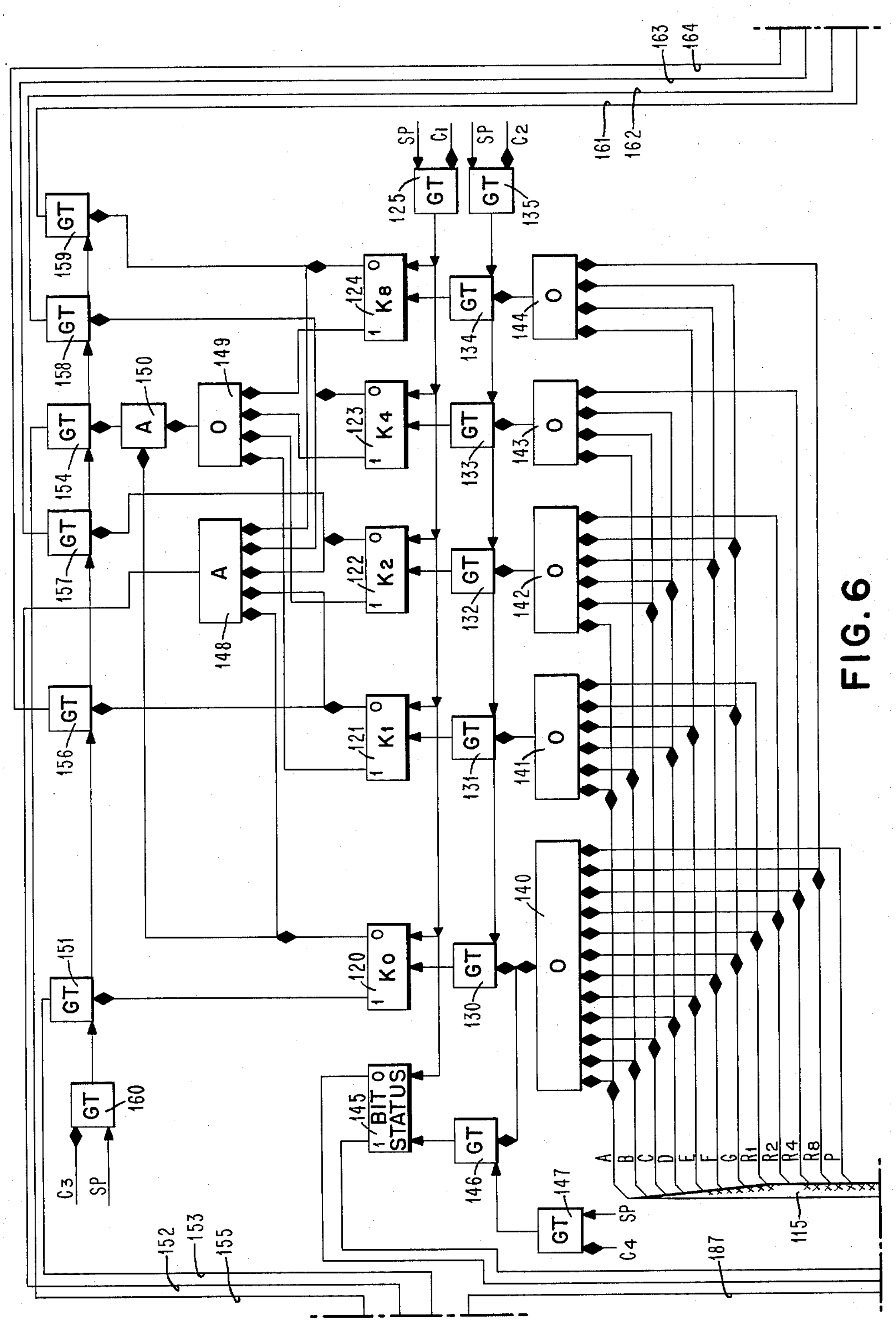

FIG. 6 is a logical block diagram of an error detector shown as block 13 in FIG. 1.

Figure 7:
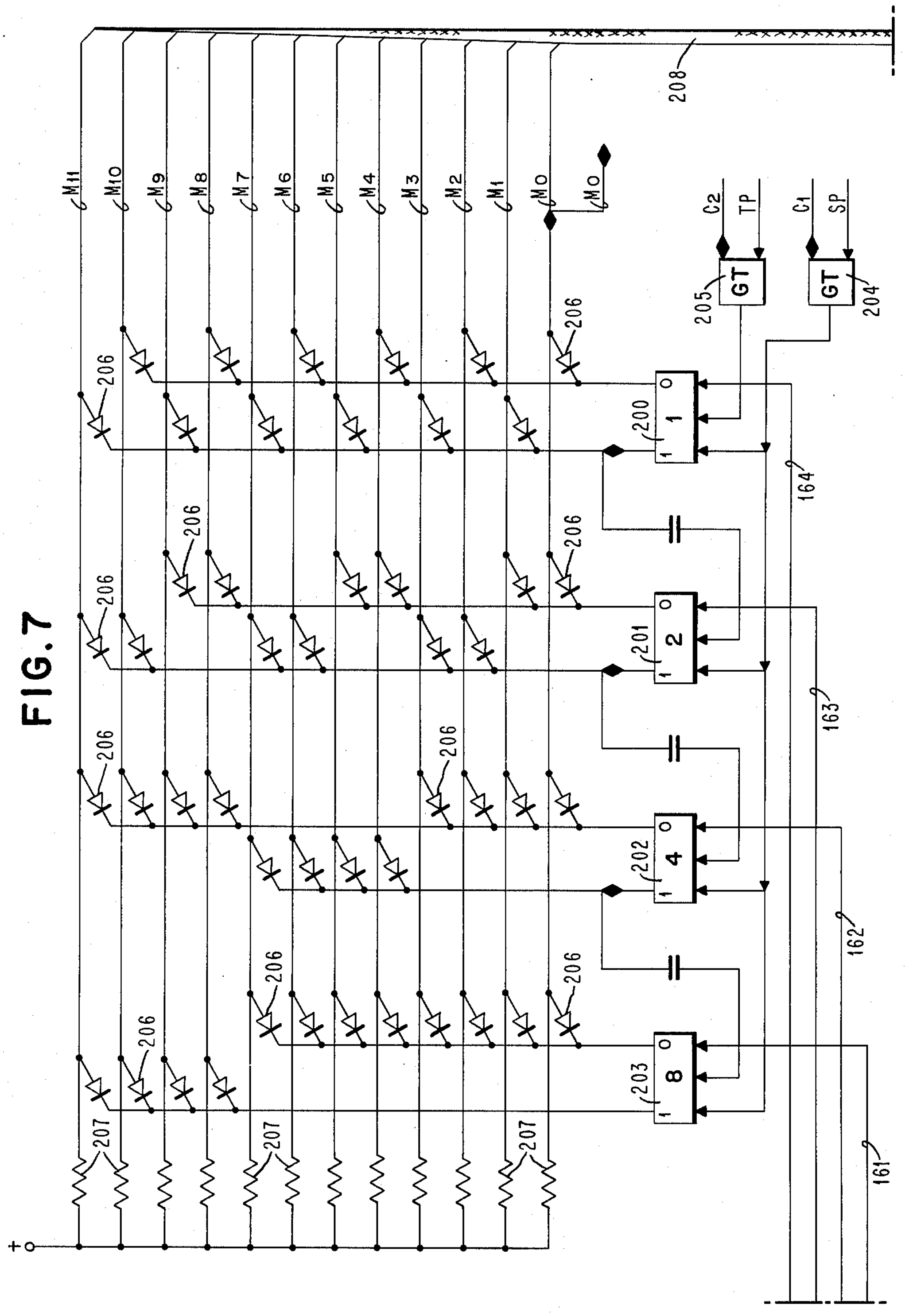

FIG. 7 is a logical block diagram of a decoder shown as block 12 in FIG. 1.

Figure 8:
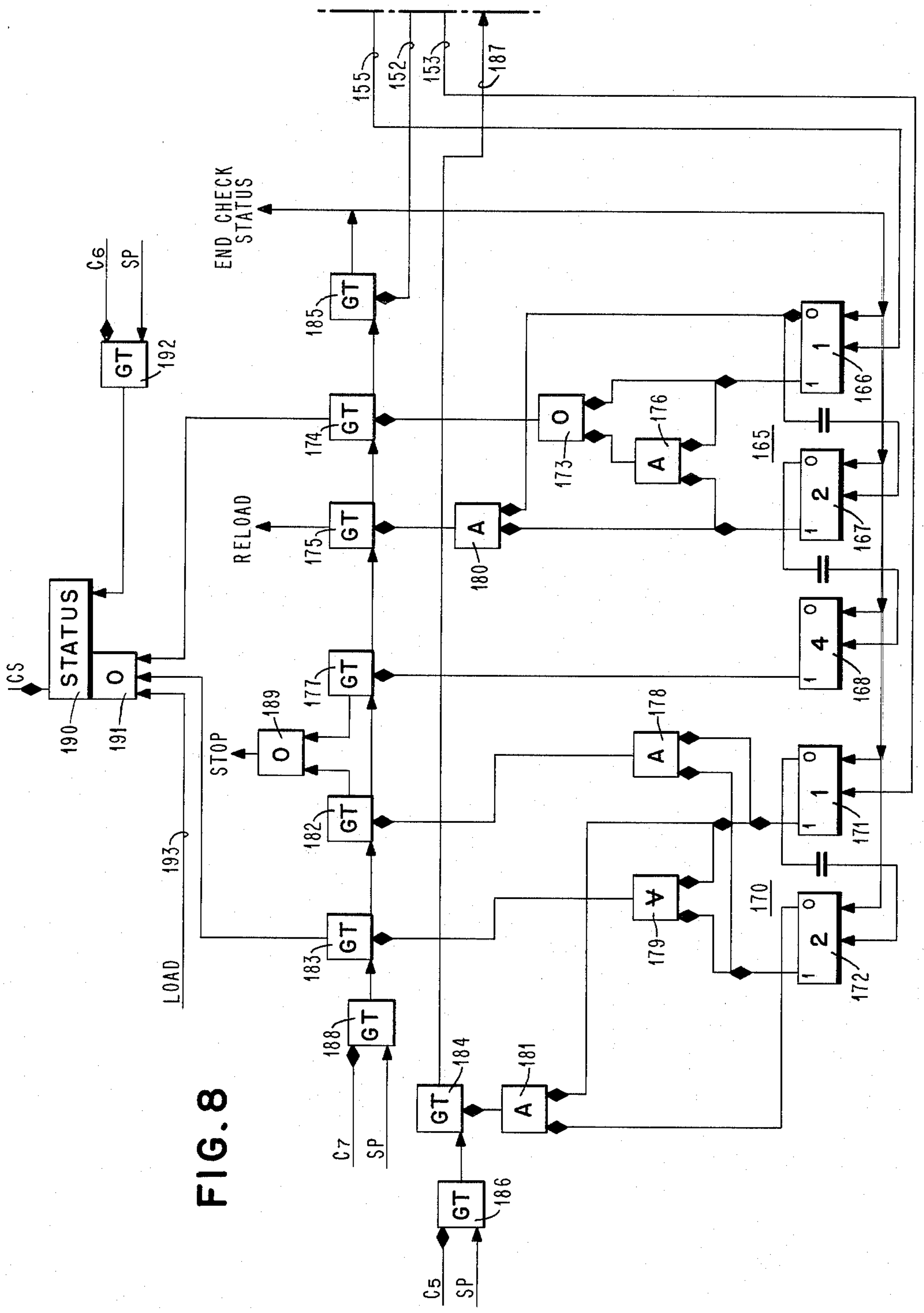

FIG. 8 is a logical block diagram of an error analyzer shown as block 14 in FIG. 1.

Figure 9:
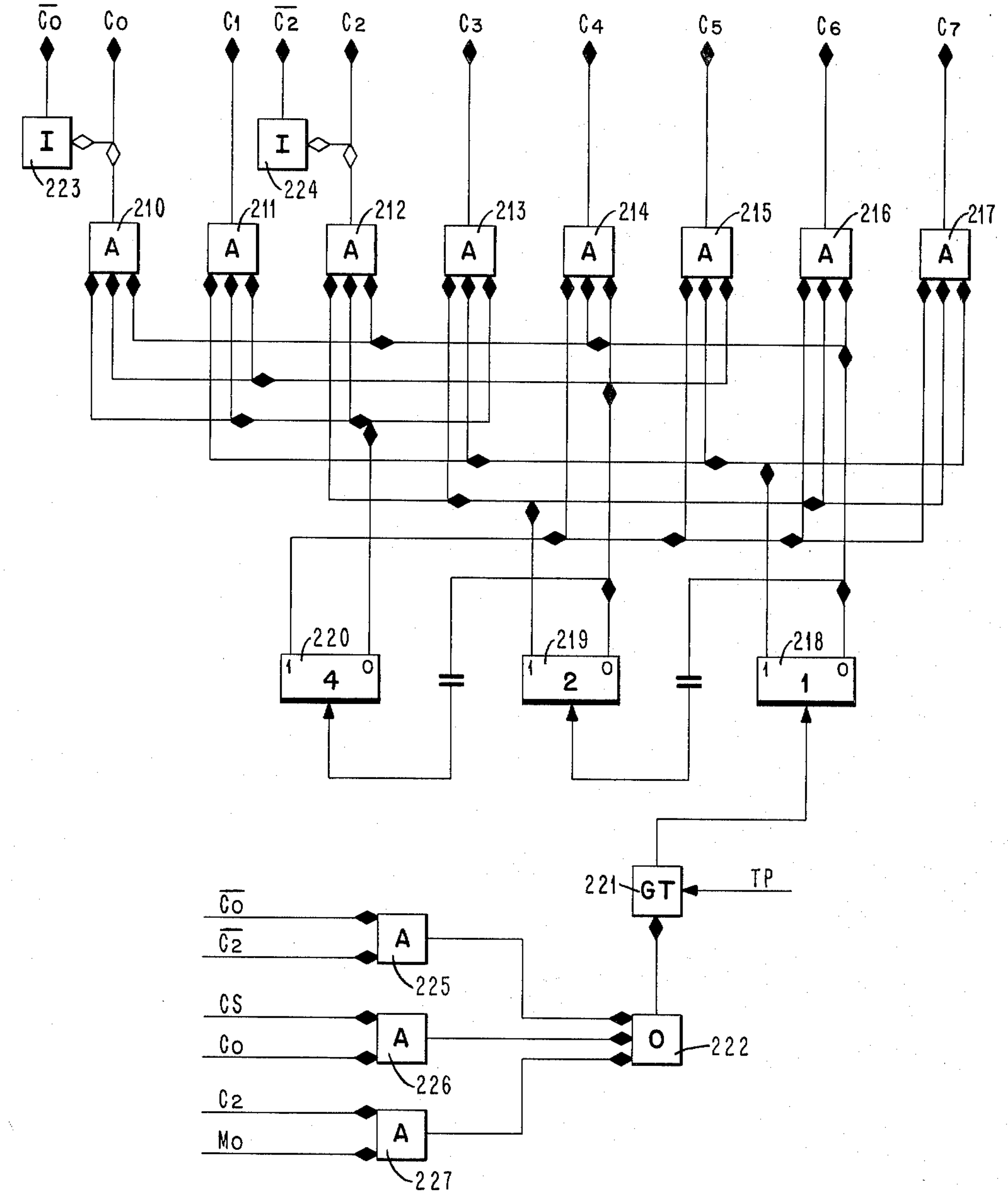

FIG. 9 is a logical block diagram of a check control counter shown as block 11 in FIG. 1.

THEORY OF CODE

A word used in the preferred embodiment of this invention consists of seven data bits, four redundancy bits, and one parity bit. Throughout the following discussion, the data bits will be referred to by letters A through G, the redundancy bits as $R_1$, $R_2$, $R_4$ and $R_8$, and the parity bit as P.

The redundancy and parity bits are encoded in the word as the parity of a unique combination of data bits. If the unique combination of data bits contains an even number of 1's, the redundancy bit will be a 0. If the combination contains an odd number of 1's the redundancy bit will be a 1. After encoding, the redundancy bit and its unique combination of data bits should present an even number of 1's.

The redundancy and parity bits with their unique combination of bits are:

$R_1=A, B, D, E, G$
$R_2=A, C, D, F, G$
$R_4=B, C, D$
$R_8=E, F, G$
$P=R_1, R_2, R_4, R_8, A, B, C, D, E, F, G$

Data bits A through G may be in any permutation arrangement and if the other five bits are encoded by the above relationships, a complete twelve bit computer word has properties of single error correction and double error detection.

A check of the accuracy of the entire word is made by checking the partity of each of the unique combinations of bits and their respective redundancy bits. A separate set of parity check bits, to be called $K_0$, $K_1$, $K_2$, $K_4$ and $K_8$ will be generated in an error detector. The parity check bits are given a binary coded decimal weight of 1, 2, 4 and 8 is a register composed of bi-stable devices. These bits are generated by the following combinations of data and redundancy bits:

$K_0=P, R_1, R_2, R_4, R_8, A, B, C, D, E, F, G$
$K_1=R_1, A, B, D, E, G$
$K_2=R_2, A, C, D, F, G$
$K_4=R_4, B, C, D$
$K_8=R_8, E, F, G$

The generation of the parity check bits in the same as the redundancy bits, in that if the combination of bits presents an even number of 1's, as it should if the bits are properly encoded, the K bit associated with the group should be 0.

Examination of the K bits will indicate the status of errors in the twelve bit computer word. There are three forms the parity check bits can take. These are:

One bit in error—$K_0$ will be 1 indicating an odd number of 1's;

Two bits in error—$K_0$ will be 0 but not all the other K bits;

No errors—all K bits will be 0;

Detection of a single error in accordance with a preferred embodiment of the invention may be corrected. Correction of a bit merely requires changing a bi-stable device from one stable state to the opposite stable state. The problem remains of identifying the particular bit in error. Each bit in the computer word is given a decimal number weight or address. These are:

| Bit | A | B | C | D | E | F | G | $R_1$ | $R_2$ | $R_4$ | $R_8$ | P |
|---|---|---|---|---|---|---|---|---|---|---|---|---|
| Weight | 3 | 5 | 6 | 7 | 9 | 10 | 11 | 1 | 2 | 4 | 8 | 0 |

As mentioned before, the K bits in combination form a binary coded decimal register. For the purpose of showing how a particular bit in error can be located, assume that bit D has been erroneously encoded or transferred to a storage device before the error check. Generation of the K bits will give the following combination:

$K_0$—1 indicating a single error;
$K_1$—1 indicating an error in its group;
$K_2$—1 indicating an error in its group;
$K_4$—1 indicating an error in its group;
$K_8$—0 indicating no error in its group.

The sum of the weight of the K bits in binary coded decimal form is decoded and found to be 7 which was the weight, or address, given to bit position D. If one of the redundancy bits, such as $R_4$, was the single error, $K_0$ would be 1 and $K_4$ would be 1 with all other K bits 0, giving a combination 0100 having a decimal weight of 4, which was the weight and address given to $R_4$ in the computer word.

If two bits were in error, say $R_8$ and F, the $K_0$ parity check bit would be 0 with the double error. All other K bits would not be 0 however. $K_8$ would be 0 because its group contains a double error leaving the group with an even number of 1's, but $K_2$ will be 1 because its group contains an odd number of 1's. A test of the K bits indicating $K_0$ is 0 and $K_2$ is 1 is sufficient to show a double error. A double error cannot be corrected in the embodiment shown, but the system could be expanded under the general theory of parity check group codes to allow for location and correction of any number of multiple errors. A signal, indicating a double error can be used to initiate other functions other than correction.

SYMBOLS USED IN DRAWINGS

The preferred embodiment of the invention will be shown by means of inter-connections between logic blocks.. The blocks are identified and include gates (GT), AND circuits (AND), OR circuits (OR), inverters (I), exclusive OR circuits ($\veebar$), and bi-stable devices (indicated by rectangular boxes with a 1 in the upper left corner and a 0 in the upper right corner).

Arrow heads and diamond heads are utilized to symbolize pulses and voltage levels respectively, and circuit connections. The logic utilizes positive changes in voltage and a positive level of voltage as the significant pulse and level. Negative levels or pulses could be used as long as the logic remains constant. As an example, a logic gate will produce a positive pulse output in response to a positive level of voltage and a coincident positive pulse.

When a series of gates are to be sampled at the same time by the same pulse, the pulse line is drawn connecting the bottom side of the series of gates with an arrow at the corner of each gate showing a connection at each of the gates to be sampled.

When a bi-stable device is said to contain a 1, the output line from the upper left hand corner labeled 1, is at a positive level. When the device is said to contain a 0, the output line from the upper right hand corner, labeled 0 is at a positive level with the 1 output line at a negative level. The bi-stable devices have three inputs which must be positive pulses to cause switching and include an input beneath the 1 side which will set the bi-stable device to a 1, an input beneath the 0 side which will set the bi-stable device to a 0, and an input in the lower center of the rectangular box which complements the bi-stable device, or switches it from its existing stable state to the opposite stable state.

The preferred embodiment will be shown as a series of logical functions, therefore any one of several well known circuits in the art should be utilized to perform those functions.

GENERAL ARRANGEMENT OF COMPONENTS (FIG. 1)

A complete twelve bit computer word is entered into a Data Storage Device 10 which is made up of a plurality of bi-stable devices. The check sequence steps are controlled by a Check Control Counter 11 which provides a series of control signals. In response to one control signal from the Check Control Counter 11 a Decoder 12 causes the computer word bits to be read out sequentially from the Data Storage Device 10 to an Error Detector 13 wherein the aforementioned parity check K bits are generated to indicate the presence or absence of an error. The information represented by the K bits is then transmitted to an Error Analyzer 14 which gives an indication as to what check sequence steps should follow. The Error Analyzer also provides the pulse necessary to cause a correction to be made. On detecting a single error in the Error Detector 13, the combination of K bits is transmitted to the Decoder 12 giving an address signal which is applied to the Data Storage Device 10 at the particular bit position in error. The check sequence system is further controlled by a series of timed pulses from a Time Pulse Generator 15 and a series of sample pulses from a Sample Pulse Generator 16. The timed pulses are generated with the same repetition rate but alternate in being applied to certain of the check sequence system components.

CHECK SEQUENCE STEPS (FIG. 2)

The computer word is read into the Data Storage Device 10 at which time the machine involved is programmed to enter a check status. The computer word bits are sequentially read out to compute the parity check K bits. The K bits are combined in such a way to indicate how many errors are present in the computer word. This indication may be no errors, a single error, or a double error. If it is indicated that there are no errors in the computer word the system will reset error counting circuits and cause the check status sequence to end. If there is an error, either single or double, counting circuits will indicate the number of cycles a single or double error has been detected.

A single error detected for the first time will cause the K bits to be decoded giving an address locating the particular bit which is in error. After the error bit has been determined, the bit is corrected and the check sequence system causes another parity check sequence computation to be initiated for the same word. If the K bits indicate there is a single error for a second cycle the system will cause the K bits to be regenerated to insure that the check system has not caused the error because of random malfunctions. If a single error in one computer word is detected for a third cycle the system will generate a signal to cause machine operations to stop.

A double error indicated for the first time will cause the K bits to be regenerated to insure there are in fact two errors. If a double error is indicated for a second time the check sequence system will cause the same computer word to be reloaded into the data storage device to insure the loading has been proper. After reloading, the K bits are again generated and if a double error is detected for a third time, K bits are regenerated to insure that it is not the generation of the K bits which is faulty. A double error detected for a fourth time after the computer word has entered the check status, will cause machine operations to stop. Since double errors can't be corrected in the embodiment shown, the system is given several chances to check the computer word before causing all operations to cease.

Any error checking system is not perfect and might intermittently fail in some of its own components. The embodiment disclosed has taken care of this by providing the rechecking and reloading feature as a check on its own components. As a result of this, a premature halt to machine operations is avoided in many cases by causing the rechecks to be made. At any time after a single or a double error has been detected causing further cycles to be initiated in the check sequence, and no error is indicated for one of the cycles, a resetting of the error counting circuits will be initiated ending the check status for the particular computer word.

DATA STORAGE DEVICE (FIGS. 4 AND 5)

The computer word, composed of seven data bits, A through G, and five redundancy bits $R_1$, $R_2$, $R_4$, $R_8$ and P, is entered into the Data Storage Device 10 (FIG. 1) into a plurality of bi-stable devices 21–32, herein depicted as flip-flop circuits which have been previously cleared to the 0 state. The flip-flops 21–32 are capable of assuming one of two stable states, remaining in that state until switched to the opposite stable state. A particular bit position in the computer word which is to contain a 1 in binary notation will be entered into its corresponding flip-flop through OR circuits 41–52 as positive input pulses. A particular bit position which is to contain a 0 will not be pulsed at the OR circuits 41–52 thereby leaving the particular flip-flop in the 0 state. As mentioned previously significant voltages are positive pulses or positive levels, therefore, any of the individual flip-flops 21–32 which contain 1's will have a positive level of voltage on 1 side output line.

A positive pulse applied to the 0 side of flip-flops 21–32 would switch a particular flip-flop from the 1 state to the 0 state and is provided through AND circuits 61–72 respectively. A positive pulse will be generated by AND circuits 61–72 in response to the coincidence of two positive levels and one positive pulse. A positive pulse may also be applied to the 1 side of each of the flip-flops 21–32 through OR circuits 41–52 respectively by pulsing the OR circuits 41–52 with a positive pulse generated from a series of AND circuits 81–92 respectively. AND circuits 81–92 are conditioned and will generate a positive pulse upon coincidence of two positive levels and one positive pulse.

The 1 side of each of the flip-flops 21–32 are applied to AND circuits 101–112. It is to be noted that any flip-flop 21–32 which contains a 0 means that the 1 side of that particular flip-flop will have a negative voltage level output and would not condition its respective AND circuit 101–112. AND circuits 101–112 will provide a positive output pulse on the coincidence of a positive level from its associated flip-flop 21–32 and a positive voltage level (to be identified later) from the Decoder 12 (FIG. 1). The outputs of AND circuits 101–112 are transmitted by way of cable 115 to the Error Detector 13 (FIG. 1).

ERROR DETECTOR (FIG. 6)

The Error Detector 13 (FIG. 1) shown in the preferred embodiment of this invention consists of a plurality of bi-stable devices 120–124 utilized to generate the parity check K bits. The bi-stable devices are shown as being flip-flop circuits capable of assuming one of two stable states wherein the condition of the flip-flop is indicated as before by a positive voltage level on the significant output line indicating a 1 or a 0. Each of the flip-flops 120–124 has two input lines. One line is pulsed by a gate 125 in response to the coincidence of a voltage level and a voltage pulse. This input is applied to the 0 side of each of the flip-flops 120–124 to set all of the flip-flops 120–124 to the 0 stable state. The second input to each of the flip-flops 120–124 is a voltage pulse applied to the binary or complement input of the flip-flop. This pulse input, represented as a pulse line to the center of the flip-flops 120–124, will cause each of the flip-flops to change from the existing stable state to the opposite stable state.

The complement input pulse is generated at each of the flip-flops 120–124 in response to a pulse generated by a series of gates 130–134 respectively. The gates 130–134 generate a positive pulse in response to a voltage level and the coincidence of a voltage pulse generated by a gate 135. Gate 135 will pulse each of the gates 130–134 in response to the coincidence of a voltage level and a voltage pulse.

The voltage levels applied to gates 130–134 are generated by a series of OR circuits 140–144 respectively. OR circuits 140–144 will produce a positive voltage level in response to a positive voltage level applied at any one of the inputs. The positive voltage level inputs to OR circuits 140–144 are generated by AND circuits 101–112 in the Data Storage Device (FIGS. 4 and 5). The inputs to OR circuits 140–144 are a unique combination of bits from the Data Storage Device and are sequentially applied to OR circuits 140–144. This operation and the reason therefore will be more fully explained later.

One function of the Error Detector is to generate the K bits. These bits are generated in flip-flops 120, 121, 122, 123, 124 and are labeled $K_0$, $K_1$, $K_2$, $K_4$ and $K_8$ respectively. Each of the flip-flops 120–124 has applied to its complement input, through its respective gate and OR circuit, an even number of inputs. The even numbered inputs are the unique combination of bits from the Data Storage Device outlined in the section entitled "Theory of Code." It can be seen that if the unique combination of inputs to the OR circuits 140–144 are even, indicating a correct encoding for that particular group, the particular flip-flop 120–124 will have applied to it an even number of complementing inputs which will leave the particular flip-flop in the 0 condition. If an error has been introduced into the computer word, the unique combination of bits from the Data Storage Device will provide an odd number of inputs to at least one of the flip-flops 120–124 leaving the particular flip-flops in the 1 state indicating the presence of the error.

It is a further function of the Error Detector to indicate the type of error present in the computer word. Indication of no error, a single error, or a double error is provided by an AND circuit 148, an OR circuit 149 in conjunction with an AND circuit 150 and a gate 151 respectively.

As mentioned under "Theory of Code" the K bits will indicate a no error condition if all K bits are 0. To give this indication of no error all of the 0 outputs from flip-flops 120–124 are applied to AND circuit 148. With 0's in all of the flip-flops 120–124 all of the voltage level inputs to AND circuit 148 will be positive and a positive voltage level will be generated by AND circuit 148 on a line 152 which will be applied to circuits to be more fully explained later in the Error Analyzer 14 (see FIG. 1).

A single error in the computer word will be indicated by the condition of flip-flop 120 which represents the $K_0$ bit. As mentioned under the section "Theory of Code" if the $K_0$ bit is a 1 this indicates that a single error has been introduced into the computer word. The 1 output line of the $K_0$ flip-flop 120 is applied to gate 151 which in response to a positive pulse from a gate 160 will indicate on a line 153 the presence of a single error in the encoded computer word. This output from gate 151 is applied by line 153 to the Error Analyzer 14 (see FIG. 1) for further analyzing to be more fully explained later.

A double error, as mentioned before, is indicated by the other K bits when $K_0$ is 0 indicating that it has received an even number of inputs through its OR circuit 140. The presence of a double error will, however, leave at least one of the remaining K bits in the 1 condition since at least one of the unique combination of inputs through the associated OR circuits will be odd, leaving at least one of the remaining K bits represented by flip-flops 121–124 in the 1 condition. A positive voltage level output from AND circuit 150 will be generated in response to a positive level on the 0 side of flip-flop 120 representing $K_0$ and the coincidence of an output from OR circuit 149 which will be generated by any one of the remaining flip-flops 121–124 remaining in the 1 condition. A positive pulse output will be generated from a gate 154 in response to the indication of a double error by AND circuit 150 and a positive pulse from gate 160. The positive pulse from gate 154, representing a double error condition, will be applied by a line 155 to the Error Analyzer 14 (see FIG. 1) for further operation to be more fully explained later.

An additional function of the Error Detector is to provide an address signal of a particular bit position of a computer word which is in error. As mentioned under the heading "Theory of Code" when $K_0$ is 1, indicating a single error, the remaining K bits, $K_1$, $K_2$, $K_4$ and $K_8$, will be in a binary coded decimal combination of 1's and 0's indicating the address of the particular bit in error. This address combination is gated out from the Error Detector by way of a series of gates 156, 157, 158, and 159. Gates 151, 154 and 156–159 are all sampled by the same positive pulse generated by gate 160 in response to the coincidence of a voltage level and a voltage pulse. The address signal is gated out of gates 156–159 by way of lines 161–164 to the Decoder 12 (FIG. 1). The reason for gating out the 0 side of flip-flops 121–124, representing the address of the particular bit in error, will be more fully explained later in connection with the Decoder operation.

The Error Detector also includes a flip-flop 145 labeled Bit Status, which is cleared to the 0 condition by gate 125. A gate 147 is provided to sample a gate 146 in response to the coincidence of a positive level and pulse. Gate 146 is conditioned by OR circuit 140. The output of gate 146 is applied to the 1 input of flip-flop 145. OR circuit 140 will indicate whether or not the addressed bit in error contains a 1. If the bit in error contains a 1, gate 146 will be conditioned, and flip-flop 145 will be set to 1. The 1 side of flip-flop 145 is applied to AND circuits 61–73, and the 0 side to AND circuits 81–92. Thus flip-flop 145 will indicate whether the bit in error should be changed from 1 to 0, or 0 *to* 1.

ANALYZER (FIG. 8)

The error Analyzer 14 (FIG. 1) consists of a double error counter 165 consisting of flip-flops 166–168 and a single error counter 170 consisting of flip-flops 171 and 172. A pulse on line 155 representing a double error from the Error Detector is applied to the complement input of flip-flop 166. Pulses indicating a single error from the Error Detector are applied by line 153 to the complement input of flip-flop 171. The counters 165 and 170 count in normal binary coded decimal fashion. When any of the flip-flops of the counters 165 or 170 are switched by the complement input from a 1 to a 0, the positive rise on the 0 line of a particular flip-flop is differentiated and applied to the complement input of a succeeding flip-flop to complement the succeeding flip-flop. In this manner the counter 165 can be caused to count from 0 through 4 in binary coded decimal fashion and the counter 170 may count from 0 through 3 in binary coded decimal fashion.

When the double error counter 165 contains a 1, an

OR circuit 173 will be conditioned to provide an output. When OR circuit 173 is conditioned and providing an output this output is applied to a gate 174. When the double error counter contains, or has counted, two double errors, flip-flop 167 will be in the 1 stable state and flip-flop 166 will be in the 0 stable state conditioning an AND circuit 180 which in turn conditions a gate 175. A double error pulse on line 155 having been received for the third time will leave both flip-flops 166 and 167 in the 1 state and an AND circuit 176 is provided to indicate the count of three. The output of AND circuit 176 is also applied to OR circuit 173 which will in turn condition gate 174. A double error detected for the fourth time will leave flip-flop 168 in the 1 stable state and the remaining flip-flops 166 and 167 in the 0 stable state. The positive level on the 1 side output of flip-flop 168 is applied to a gate 177.

Single error counter 170, as mentioned before, will indicate the number of cycles in which a single error has been detected by pulses received on line 153 from the Error Detector. The count of the single error counter is indicated by a series of logic circuits energized by the flip-flops 171 and 172. These include an AND circuit 178, an exclusive OR circuit 179, and an AND circuit 181. AND circuit 178 will indicate a single error count of 3. Exclusive OR circuit 179 will indicate a single error count of 1 or 2, but not 3 or 0. AND circuit 181 will indicate a count of 1 but not 2 or 3 or 0. AND circuit 178 conditions a gate 182. Exclusive OR circuit 179 conditions a gate 183. AND circuit 181 conditions a gate 184.

A gate 185 is conditioned by a voltage level applied by line 152 from the Error Detector indicating that there are no errors in the computer word.

A gate 186 is provided for generating a sample pulse to gate 184 in response to the coincidence of a voltage level and pulse. The flow chart (see FIG. 2) has indicated that when a single error has been detected for the first time a particular bit in error which has been located is to be corrected. The output of gate 184 which indicates that a single error has been detected only for the first time, provides a pulse by way of a line 187 to each of the AND circuits 61–72 and 81–92 in the data storage device (see FIGS. 4 and 5). The correcting pulse generated on line 187 in combination with a bit status level from flip-flop 145 (see FIG. 6) and an address signal from the decoder (more fully explained in the following section) will condition only one of the AND circuits 61–72 and 81–92 causing the addressed bit in error to be corrected.

An AND circuit 188 is provided in the Error Analyzer to sample gates 174, 175, 182, 183, and 185.

A flip-flop 190, labelled Status, is provided to indicate whether or not an error check cycle should be made at a particular time. The flip-flop 190 has an OR input 191 to its 1 side and a gate input 192 to its 0 side.

The control signals generated by the gates sampled by gate 188 may be followed in conjunction with the flow chart shown in FIG. 2 and are as follows:

Gate 185—no error; end the check status for this computer word transmitted to the computer and clear the double error counter 165 and the single error counter 170.

Gate 174—a double error for the first or third time; initiate the check cycle for this computer word again.

Gate 175—double error for the second time; reload this computer word into the Data Storage Device transmitted to the computer.

Gate 177—double error for the fourth time; cause machine operations to stop generated by an OR circuit 189.

Gate 182—single error for the third time; cause machine operations to stop generated by OR circuit 189.

Gate 183—single error for a first or second time, but not the third time; cause a check cycle to be initiated again for this computer word.

A check cycle is also initiated by the Status flip-flop 190 upon entry of a new computer word to be checked or the reloading of a computer word to be rechecked and is indicated by the input to OR circuit 191 on line 193.

DECODER (FIG. 7)

The Decoder 12 (FIG. 1), as mentioned previously, has a function of sequentially reading out the individual bit positions in the Data Storage Device to the Error Detector. To accomplish this function there is provided in the Decoder a binary coded decimal counter consisting of bi-stable devices or flip-flops 200–203. As a check cycle is initiated the flip-flops 200–203 are all set to the 1 stable state by a pulse generator from a gate 204 upon the coincidence of a voltage level and voltage pulse. The flip-flops 200–203 constitute a binary coded decimal counter which is caused to count backwards from 15 to 0 and through 0 back to 15 in response to count pulses generated from a gate 205 upon the coincidence of a voltage level and a voltage pulse. In order to cause the binary coded decimal counter to count backwards the input pulses to be counted are applied to the complement input of the least significant flip-flop position and as a lesser significant flip-flop is switched from the 0 stable state to the 1 stable state the rise in voltage on the 1 output line is differentiated and applied to the succeeding flip-flop stage at its complement input. With the flip-flops 200–203 all set to the 1 stable state the count represented by the counter is 15 in accordance with the binary weight given to the combination of flip-flops 200–203. The first incoming pulse from gate 205 will cause flip-flop 200 to switch from the 1 stable state to the 0 stable state. This switching action is from 1 to 0 and therefore will not trigger the flip-flop 201. The second pulse to be counted from gate 205 will cause flip-flop 200 to switch from the 0 to the 1 stable state and the rise in voltage on the 1 output line will be differentiated and applied to the complement input of flip-flop 201, switching flip-flop 201 from the 1 stable state to the 0 stable state. In this manner the counter consisting of flip-flops 200–203 can be caused to count 1111–1110–1101–1100–1011 through 0000, at which time the next incoming pulse will switch flip-flop 200 from 0 to 1 causing the complementing of all of the flip-flops until the flip-flops are again set in the 1 stable state representing a count of 15.

The 1 and 0 outputs of the flip-flops 200–203 are applied to a matrix, here shown as a diode matrix in the preferred embodiment of this invention. Twelve output lines are shown emanating from the diode matrix. These are M0, M1, through M11. These output lines generate a positive voltage level sequentially as the counter flip-flops 200–203 count down. The output level of each of the output lines M0 through M11 will rise to the positive level upon the coincidence of a positive level applied to each of four diodes 206 connecting the flip-flop outputs in a particular combination to a single output line. These four diodes 206 on each of the output lines form, in connection with resistors 207 and the positive supply voltage, an AND condition for a positive voltage level to be applied to an output line. If any one diode 206 on an output line is connected to a flip-flop output line which is at the negative voltage level, the output line will be held at that negative voltage level as the diode 206 will be forward biased. Upon the coincidence of four positive levels applied to the four diodes 206 connected to one output line the voltage level of that output line will rise. This arrangement allows the sequential reading out of the individual bit positions in the Data Storage Device as individual output lines M11 through M0, carried by cable 208, are applied to one of the AND circuits 101–112 as indicated in FIGS. 4 and 5.

Another function of the Decoder, as mentioned previously, is to provide an address signal to locate a particular bit position in error in the Data Storage Device. When the counter flip-flops 200–203 have counted down to 0, another input pulse is applied which resets the counter to represent 15 or a combination of all 1's in the flip-flops 200–203. Later in the check cycle, the K bits or flip-flops 121–124 of the Error Detector (FIG. 6) are to represent in binary coded decimal form, in accordance with weights given the K bits, the address of the particular bit in error. The contents of flip-flops 121–124 must be placed in the flip-flops 200–203 of the Decoder in order to energize one of the matrix output lines M0 through M11 which is applied to a particular bit position of the Data Storage Device. As mentioned previously in connection with the Error Detector (FIG. 6) the 0 output line of flip-flops 121–124 are gated out to the Decoder. The Decoder flip-flops 200–203 have been left in the 1 stable state so in order to place the contents of the flip-flops 121–124 (FIG. 6) into flip-flops 200–203 it is only necessary to gate out the 0 output of flip-flops 121–124 to the 0 side of flip-flops 200–203. In this fashion any flip-flop 121–124 containing a 0 will place a 0 in the corresponding flip-flop 200–203. The combination of 1's in flip-flops 200–203, as mentioned under the heading of "Theory of the Code," will energize one of the matrix output lines which is the weight or address given to a particular bit position and will be the particular bit position which is in error as indicated by flip-flops 121–124 of the Error Detector (FIG. 6).

This matrix output line indicative of the address of the particular bit in error is carried again by cable 208 to the Data Storage Device. The positive voltage level on the energized output line is applied to both the input and output AND circuits of a particular flip-flop 21–32 containing the bit which is in error (FIGS. 4 and 5). The line applied to the output AND circuit is utilized to cause the Bit Status Flip-Flop 145 in the Error Detector (FIG. 6) to assume the same stable state as the flip-flop in error. As mentioned previously in connection with the Error Detector (FIG. 6) and the Error Analyzer (FIG. 8), this address signal in connection with the Bit Status flip-flop output 145 and the correcting pulse generated by gate 184 of the Error Analyzer (see FIG. 8) will be coincident at only one of the AND gates 61–72 or AND gates 81–92 (see FIGS. 4 and 5) causing a particular bit position in error to be switched from the existing stable state to the opposite stable state.

CHECK CONTROL COUNTER (FIG. 9)

Control of the check sequence cycle is generated by the Check Control Counter 11 (see FIG. 1). The control signals C0 through C7 are generated by AND circuits 210–217. AND circuits 210–217 provide a positive output level upon the coincidence of three inputs generated by a combination of flip-flops 218, 219, and 220 which make up a binary coded decimal counter. The flip-flops 218–220 count in binary coded decimal fashion in the normal manner upon the application of a series of positive pulses to the complement input of flip-flop 218. The pulses to be counted are generated by a gate circuit 221 upon the coincidence of a positive voltage level from an OR circuit 222 and a series of time pulses (TP) generated by the Time Pulse Generator (FIG. 1). The Check Control Counter also generates a pair of voltage levels indicating the absence of C0 and C2 from inverter circuits 223 and 224 respectively.

The control levels C0–C7 are generated at the proper time by conditioning OR circuit 222 by a series of AND circuits 225, 226 and 227. At the beginning of each check cycle the Check Control Counter will be set to zero generating a C0 level. When a new computer word has been loaded into the Data Storage Device 10 the status flip-flop 190 (FIG. 8) will be set to the 1 condition generating the control signal CS. The coincidence of the control signal CS and C0 at AND circuit 226 conditions OR circuits 222 which in turn conditions gate 221 and at the coincidence of the next time pulse (TP) at gate 221 the counter flip-flops will be stepped one and output control signal C1 will be generated. With the control signal C1 being generated there will be an absence of C0 and an absence of C2 control signals. These signals being applied to AND circuit 225 will condition OR circuit 222 and in turn gate 221 such that the next succeeding time pulse will step the Check Control Counter to the next position generating the control signal C2. With the presence of control signal C2, AND circuit 225 will be deenergized and with the absence of C0, AND circuit 226 will be deenergized. AND circuit 227 has as its two inputs the control signal C2 and the output from the diode matrix M0. At this time, however, the M0 output line from the diode matrix will not be energized. The Decoder flip-flops 200–203 are being stepped down from a count of 15 to a count of 0 by the coincidence at gate 205 of the control signal C2 and time pulses. It will now take 15 time pulse intervals to step the Decoder flip-flops 200–203 until the matrix output line M0 will be energized indicating a count of zero in these flip-flops (see FIG. 7). When the matrix output line M0 is energized, the immediately following time pulse will not only reset the Decoder flip-flops 200–203 to a count of 15, but at the same time AND circuit 227 (FIG. 9) will be conditioned by the presence of a control signal C2 and M0 at which time the same time pulse which set the decoder back to 15 will also cause gate 221 to generate the next count pulse input to flip-flop 218 causing the Check Control Counter to step, generating control signal C3. At this time, the check control counter will step through the remaining control signals C4, C5, C6, C7 and back to C0 because AND circuit 225 is conditioned by the absence of control signals C0 and C2.

OPERATION OF CIRCUITS

Operation of the circuits shown in the preferred embodiment of this invention will be described in connection with operations performed during the interval of each of the control signals C0 through C7.

*C0*

During C0 time the check sequence circuits are awaiting the entry of a new computer word into the Data Storage Device 10. As the new computer word is entered into the flip-flops 21–32 by way of OR circuits 41–52 respectively (FIGS. 4 and 5), the status flip-flop 190 (FIG. 8) will be set to the 1 stable state generating the control signal CS. The coincidence of the control signal CS and C0 at AND circuit 226 of the Check Control Counter (FIG. 9) will cause the immediately following time pulse to gate a pulse out of gate 221 to flip-flop 218 causing control signal C1 to be generated.

*C1*

During the interval C1, the control signal C1 and the immediately following sample pulse SP will be coincident at the following gates and perform the following functions:

Gate 125 (FIG. 6)—clear to the 0 stable state flip-flops 120–124 and 145;

Gate 204 (FIG. 7)—set Decoder flip-flops 200–203 to the 1 stable state.

The Check Control Counter will be stepped to generate control signal C2 by the time pulse (TP) immediately following the previously mentioned sample pulse (SP) because AND circuit 225 (FIG. 9) will be energized by the absence of C0 and C2.

*C2*

During the interval C2 the Check Control Counter will not be stepped for the interval of 15 time pulses.

The alternate generation of time pulses (TP) and sample pulses (SP) will cause the following operations to take place at the indicated gates:

Gate 205 (FIG. 7)—the Decoder flip-flops 200–203 will be caused to count down from 15 to 0 upon the application of each time pulse. After the fourth time pulse has arrived at AND circuit 205 the count will stand at 11 thereby energizing the matrix output line M11. Matrix output line M11 will in turn provide a positive output level to AND circuit 107 (FIG. 4). If the Data Storage Device flip-flop 27 contains a 1 for that particular computer word, AND circuit 107 would provide a positive voltage level output applied by way of cable 115 to OR circuits 140, 141, 142, and 144, of the Error Detector (FIG. 6). The bit position G is to be applied to the flip-flops representing K bits $K_0$, $K_1$, $K_2$ and $K_3$ as indicated in the section entitled "Theory of the Code."

Gate 135 (FIG. 6)—immediately following the time pulse which caused the matrix output M11 to be energized the alternate sample pulse (SP) will be applied to gate 135 which in turn will sample gates 130–134. As indicated previously OR circuits 120, 141, 142 and 144, have been energized by AND circuit 107 (FIG. 4) so gates 130, 131, 132, and 134, will provide a positive pulse input to flip-flops 120, 121, 122 and 124 respectively.

Alternate time pulses (TP) and sample pulses (SP) will be generated during the interval C2 until the Decoder flip-flops 200–203 (FIG. 7) have counted down to zero energizing the matrix output line M0. In this manner the contents of the Data Storage Device will have been sequentially read out through AND circuits 101–112 and gated into the proper K bit flip-flops 120–124 in the Error Detector through gates 130–134.

Upon the coincidence of the control signal C2 and the matrix output line M0 at AND circuit 227, the next time pulse (TP) will cause the Check Control Counter (FIG. 9) to be stepped to the next interval C3, and in addition will cause the Decoder flip-flops 200–203 to be set to the count of 15. As the control signal C2 has disappeared, the Decoder counter flip-flops 200–203 will no longer be pulsed by gate 205.

*C3*

The coincidence of the control signal C3 and the immediately following sample pulse (SP) at gate 160 of the Error Detector (FIG. 6) will cause the gate 160 to sample gates 151, 154, and 156–159.

If gate 151 has been conditioned indicating a single error an output pulse will be generated on line 153 to the single error counter 170 in the Error Anaylzer (FIG. 8).

If a double error has been indicated, gate 154 will be conditioned and an output pulse will be applied by line 155 to the double error counter 165 of the Error Analyzer (FIG. 8).

Gates 156–159 will be sampled and the contents of flip-flops 121–124 will be placed in the flip-flops 200–203 of the Decoder (FIG. 7) giving the address of a particular bit in the computer word which is in error energizing the correct matrix output line.

The time pulse (TP) immediately following the sample pulse (SP) will step the Check Control Counter to generate control signal C4 (FIG. 9).

*C4*

The address of a particular bit in error will have been loaded into the flip-flops 200–203 of the Decoder (FIG. 7) and one of the matrix output lines M0–M11 will be energized and will be applied to one of the AND circuits 101–112 of the Data Storage Device (FIGS. 4 and 5). The particular AND circuit 101–112 of the Data Storage Device will either generate a positive voltage level or not, dependent upon whether or not its associated flip-flop 21–23, which is the flip-flop in error, contains a 1 or a 0. If the flip-flop 21–32, which was addressed by the matrix output, contains a 1 its associated AND circuit will provide an output via cable 115 to OR circuit 140 of the Error Detector (FIG. 6). The coincidence of control signal C4 and the immediately following sample pulse applied to gate 147 of the Error Detector will sample gate 146 and will set the Bit Status flip-flop 145 to a 1 if the addressed flip-flop in error contains a 1.

The 1 side output of the Bit Status flip-flop 145 is applied to each of the AND circuits 61–72 of the Data Storage Device and the 0 side output of the Bit Status flip-flop 145 is applied to each of the AND circuits 81–92 of the Data Storage Device (see FIGS. 4 and 5).

The time pulse (TP) following the sample pulse (SP) will be applied to the Check Control Counter and the Check Control Counter will be stepped to the next control signal C5.

*C5*

The control signal C5 and the immediately following sample pulse coincide at gate 186 (FIG. 8) of the Error Analyzer. The output of gate 186 samples gate 184. Gate 184, as mentioned previously indicates that a single error has been detected for the first time and that a correction should be made. If a single error has been detected for the first time an output pulse will be generated on line 187 from the gate 184 and will be applied to each of the AND circuits 61–72 and 81–92 of the Data Storage Device (FIGS. 4 and 5).

Only one of the AND circuits 61–72 and 81–92 will produce an output pulse. Assume that bit position G contained in flip-flop 27 was the erroneous bit and contained a 1. Flip-flop 27 would have been addressed by the matrix output line M11 which would condition both gates 87 and 67. The Bit Status flip-flop 145 in the Error Detector (FIG. 6) would have been set to a 1 thus providing a positive level voltage at AND gate 67, but not 87. The correcting pulse generated on line 187 is applied to all of the input AND circuits in the Data Storage Device, but only AND circuit 67 will have the two required positive levels applied coincident with the correcting pulse to generate a pulse to the 0 side of flip-flop 27. Thus flip-flop 27, which erroneously contained a 1 has been reversed to contain a 0, the correct indication. It is to be noted that a correcting pulse on line 187 only occurs when a single error has been detected for the first time. This pulse is inhibited in all other phases of rechecking and reloading of one computer word.

The next time pulse (TP) applied to gate 221 of the Check Control Counter (FIG. 9) will step the Check Control Counter to produce the control signal C6.

*C6*

The imediately following sample pulse (SP) will be coincident with the control signal C6 at gate 192 (FIG. 8). The output of gate 192 is applied to the 0 side of the Status flip-flop 190 setting the Status flip-flop 190 to 0.

The next time pulse (TP) applied to gate 221 of the Check Control Counter will step the check control counter to produce control signal C7.

*C7*

The coincidence of control signal C7 and the next sample pulse (SP) at gate 188 (FIG. 8) of the Error Analyzer will sample gates 174, 175, 177, 182, 183 and 185. The output of these gates produces signals indicating what operations are to follow.

If there was no error in the computer word, gate 185 will have been conditioned by AND circuit 148 of the Error Detector (FIG. 6). Gate 185 will produce a signal indicating that the check status for this computer word has come to an end and also will clear the error counters 165 and 170.

A single error detected for the first or second time will have conditioned the gate 183. Gate 183 would produce a pulse through OR circuit 191 to the Status flip-flop 190 to set the Status flip-flop 190 to the 1 state generating the control signal CS.

A single error detected for the third time for this computer word will have conditioned gate 182. Gate 182 would produce a pulse through OR circuit 189 to cause machine operations to stop.

A double error detected for the first or the third time for one computer word would have conditioned gate 174. Gate 174 would produce an output pulse through OR circuit 191 to the 1 input of the Status flip-flop 190, again producing the control signal CS.

A double error detected for the second time in this computer word, would have conditioned gate 175 and it would produce a signal causing the Data Storage Device flip-flops 21–32 to be cleared and cause the same computer word to be reentered into the Data Storage Device.

A double error detected for the fourth time in this computer word will have conditioned gate 177 and an output pulse from gate 177 applied through OR circuit 189 will cause machine operations to stop.

The next time pulse (TP) applied to gate 221 of the Check Control Counter (FIG. 9) will step the Check Control Counter to produce control signal C0.

*C0*

The Check Control Counter will be stepped up from control signal C0 to initiate another cycle of checking only if control signal CS is present at AND circuit 226. Control signal CS from the Status flip-flop 190 in the Error Analyzer (FIG. 8) will be generated under the following conditions:

(1) loading of a computer word into the Data Storage Device;

(2) a single error detected for the first or the second time;

(3) a double error detected for the first or the third time.

The system here described affords every opportunity for correcting an error which may have been introduced in the encoding of a binary computer word. Single error correction and double error detection in the encoding of the word is assured, but equally important is the fact that the system has the ability to check its own proper functioning. Down time of the associated machine will be cut to a minimum by preventing unnecessary, premature stoppages. This will allow longer periods in which an operator may leave a machine unattended without fear of a breakdown requiring his attention.

While the invention has been particularly shown and described with reference to a preferred embodiment, it will be understood by those skilled in the art that various changes in form and details may be made therein without departing from the spirit and scope of the invention.

I claim:

1. In an error detecting and correcting system, apparatus comprising, in combination, a data storage device having a plurality of stages capable of assuming one of two stable states indicative of information, output means connected to said storage device, an error detector responsive to said output means for receiving manifestations of the information contained in said storage device, said detector including means responsive to said manifestations for producing a plurality of signals in response thereto, at least one of said signals indicating that only one of said stages has assumed an incorrect stable state, means connected to said output means, responsive to applied pulses, for causing the manifestations of the information contained in said data storage device to be read out to said error detector, said readout means also responsive to other signals from said detector for producing a signal identifying the particular stage in said data storage device which has assumed the incorrect stable state, and an error analyser including a counter responsive to said single error signal from said detector for counting the number of cycles said data storage device has had a single stage in error for the particular information contained.

2. Apparatus in accordance with claim 1 including means responsive to the count in said counter to produce a control signal indicating that a single error has occurred only once, and means responsive to a combination of said signal, one of the plurality of said signals from said detector and said stage identifying signal for causing said stage in error to assume the correct stable stage.

3. Apparatus in accordance with claim 1 including means responsive to the count in said counter to produce a control signal indicating that a single error has occurred twice, whereby said readout means is caused to read out the information in said data storage device to said detector without having previously attempted a correction.

4. Apparatus in accordance with claim 1 including means responsive to the count in said counter to produce a control signal indicating that a single error has occurred three times, said control signal being utilized to halt operations.

5. In an error detecting and correcting system, apparatus comprising, in combination, a data storage device having a plurality of stages capable of assuming one of two stable states indicative of information, output means connected to said storage device, an error detector responsive to said output means for receiving manifestations of the information contained in said data storage device, said detector including means responsive to said manifestations for producing a plurality of signals in response thereto, at least one of said signals indicating that two of said stages have assumed an incorrect stable state, means connected to said output means, responsive to applied pulses for causing the manifestations of the information contained in said data storage device to be read out to said error detector, and an error analyser including a counter responsive to said double error signal of said detector for counting the number of cycles two of said stages have assumed an incorrect stable state for the particular information contained.

6. Apparatus in accordance with claim 5 including means responsive to the count in said counter to produce a control signal indicating the first or third time two of said stages have assumed an incorrect stable state, whereby the information in said data storage device is caused to be read out to said error detector without having previously attempted a correction.

7. Apparatus in accordance with claim 5 including means responsive to the count in said counter to produce a control signal indicating the second time two of said stages have assumed an incorrect stable state, whereby the information is caused to be re-entered into said data storage device without having previously attempted a correction.

8. Apparatus in accordance with claim 5 including means responsive to the count in said counter to produce a control signal indicating the fourth time two of said stages have assumed an incorrect stable state, said control signal causing operations to halt.

9. An error detecting and correcting system comprising, in combination, a data storage device having input circuit means and output circuit means, an error detector responsive to said output means for receiving manifestations of information contained in said data storage device, said detector including means responsive to said manifestations for producing a plurality of signals in response thereto indicative of the accuracy of the information contained in said data storage device, a plurality of bistable devices forming a counter, a matrix connected to said counter, said matrix and said counter operative to sequentially cause the information in said data storage device to be read out through said output circuit means to said error detector, said bi-stable devices and said matrix also responsive to other signals from said detector for producing a signal identifying an error in said data storage device, and control means responsive to the plurality of signals from said detector for producing a plurality of control signals, said input means responsive to a combination of at least one of said control signals, one of the plurality of signals from said detector and said error identifying signal from said matrix for causing a correction to be made in said data storage device.

10. An error detecting and correcting system comprising, in combination, a data storage device having a plurality of stages, each of said stages having input circuit means and output circuit means, an error detector responsive to said output means for receiving manifestations of information contained in said data storage device, said detector including means responsive to said manifestations for producing a plurality of signals in response thereto indicative of the accuracy of the information contained in said data storage device, a plurality of bi-stable devices forming a counter, a matrix connected to said bi-stable devices responsive to the count in said counter for providing a plurality of outputs, each of said outputs from said matrix being applied to the input and output circuit means associated with a particular one of said stages of said data storage device, means responsive to applied pulses to cause said counter to count for sequentially energizing said matrix outputs to cause the manifestations of the information contained in said data storage device to be read out through said output circuit means to said error detector, said bi-stable devices also forming an address register responsive to other signals from said detector for producing an error identifying signal on one output of said matrix to be applied to its particular input circuit means of one of said stages of said data storage device, and control means responsive to the plurality of signals from said detector for producing a plurality of control signals, said input means responsive to a combination of at least one of said control signals, one of the plurality of signals from said detector and said error identifying signal from said matrix for causing a correction to be made in said data storage device.

11. An error detecting and correcting system comprising, in combination, a data storage device having a plurality of stages capable of assuming one of two stable states indicative of information, each of said stages having input circuit means and output circuit means, a plurality of bi-stable devices for receiving from said output circuit means manifestations of the information contained in said data storage device, means responsive to the stable state of said bi-stable devices for producing a plurality of signals in response thereto indicative of the accuracy of the information contained in said data storage device, at least one of said signals indicating that one of said stages has asumed an incorrect stable state, a plurality of other bi-stable devices forming a binary coded decimal counter, a matrix connected to said counter providing a plurality of sequential outputs in response to the count in said counter, each of said outputs being applied to the input circuit means and output circuit means of a particular one of said stages of said data storage device, means responsive to applied pulses to cause said counter to count for sequentially causing the manifestations of the information contained in said data storage device to be read out through said output circuit means to said first mentioned bi-stable devices, said other bi-stable devices also forming an address register responsive to the manifestations in said first mentioned bi-stable devices for producing an error identifying signal from said matrix to be applied to said output circuit means and said input circuit means of said stage which has assumed an incorrect stable state, means responsive to the existing stable state of said stage in error for generating a bit status signal, and an error analyzer responsive to said single error signal for producing a control signal, said input circuit means responsive to a combination of said control signal, said bit status signal and said error identifying signal from said matrix for causing said stage in error to assume the opposite stable state.

References Cited by the Examiner

UNITED STATES PATENTS

| | | | |
|---|---|---|---|
| 23,601 | 12/52 | Hamming | 340—147 |
| 2,954,432 | 9/60 | Lewis et al. | 340—147 |
| 2,954,433 | 9/60 | Lewis et al. | 340—147 |
| 2,969,912 | 1/61 | Reynolds | 235—153 |
| 2,977,047 | 3/61 | Bloch | 235—153 |

OTHER REFERENCES

"Orthotronic Control" Technical Bulletin by Datamatic, Oct. 23, 1958.

MALCOLM A. MORRISON, *Primary Examiner.*

IRVING L. SRAGOW, *Examiner.*